(12) United States Patent
Yang et al.

(10) Patent No.: US 9,210,698 B2
(45) Date of Patent: Dec. 8, 2015

(54) METHOD AND APPARATUS FOR TRANSMITTING UPLINK CONTROL INFORMATION IN A WIRELESS COMMUNICATION SYSTEM

(75) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 13/985,266

(22) PCT Filed: Feb. 15, 2012

(86) PCT No.: PCT/KR2012/001136
§ 371 (c)(1),
(2), (4) Date: Aug. 13, 2013

(87) PCT Pub. No.: WO2012/111975
PCT Pub. Date: Aug. 23, 2012

(65) Prior Publication Data
US 2013/0322391 A1    Dec. 5, 2013

Related U.S. Application Data

(60) Provisional application No. 61/442,818, filed on Feb. 15, 2011.

(51) Int. Cl.
*H04W 4/00* (2009.01)
*H04W 72/04* (2009.01)
*H04L 5/00* (2006.01)

(52) U.S. Cl.
CPC ........... *H04W 72/0413* (2013.01); *H04L 5/001* (2013.01); *H04L 5/0055* (2013.01); *H04L 5/0057* (2013.01)

(58) Field of Classification Search
CPC ........... H04B 7/0404; H04B 2201/698; H04B 7/0626; H04L 5/0057; H04L 1/0693; H04W 52/146
See application file for complete search history.

(56) References Cited

U.S. PATENT DOCUMENTS 8,553,627 B2 * 10/2013 Yin et al. ................... 370/329
8,675,528 B2 * 3/2014 Khoshnevis et al. ....... 370/310

(Continued)

FOREIGN PATENT DOCUMENTS

WO    2010/064788    6/2010
WO    2010/104365    9/2010

OTHER PUBLICATIONS

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.0.1, Dec. 2010, 98 pages.

(Continued)

Primary Examiner — Brian O'Connor
(74) Attorney, Agent, or Firm — Lee, Hong, Degerman, Kang & Waimey

(57) ABSTRACT

The present invention relates to a method and apparatus for transmitting uplink control information (UCI) in a carrier aggregation system wherein a plurality of serving cells is aggregated. The method comprises the steps of: receiving a downlink signal through at least one of the serving cells; generating first UCI and second UCI responding to the downlink signal; transmitting the first UCI through a first serving cell; and transmitting the second UCI through a second serving cell. The first serving cell and the second serving cell are different from each other, and the first UCI and the second UCI are different kinds of uplink control information than each other.

18 Claims, 16 Drawing Sheets

(56) References Cited

U.S. PATENT DOCUMENTS

| | | | |
|---|---|---|---|
| 8,750,143 B2* | 6/2014 | Yin | 370/252 |
| 2010/0098012 A1 | 4/2010 | Bala et al. | |
| 2010/0118720 A1 | 5/2010 | Gauvreau et al. | |
| 2011/0242997 A1* | 10/2011 | Yin | 370/252 |
| 2012/0120817 A1* | 5/2012 | Khoshnevis et al. | 370/252 |
| 2012/0127869 A1* | 5/2012 | Yin et al. | 370/252 |
| 2012/0178494 A1* | 7/2012 | Haim et al. | 455/522 |
| 2012/0210187 A1* | 8/2012 | Yin et al. | 714/751 |
| 2013/0136083 A1* | 5/2013 | Yin | 370/329 |
| 2013/0178221 A1* | 7/2013 | Jung et al. | 455/450 |
| 2013/0230004 A1* | 9/2013 | Nam et al. | 370/329 |
| 2014/0161060 A1* | 6/2014 | Nam et al. | 370/329 |
| 2014/0177572 A1* | 6/2014 | Papasakellariou et al. | 370/329 |
| 2014/0321395 A1* | 10/2014 | Baldemair et al. | 370/329 |

OTHER PUBLICATIONS

3rd Generation Partnership Project (3GPP), "Technical Specification Group Radio Access Network; Evolved Universal Terrestrial Radio Access (E-UTRA); Physical channels and modulation (Release 10)," 3GPP TS 36.211 V10.0.0, Dec. 2010, 103 pages.

Korean Intellectual Property Office Application Serial No. 10-2013-7021351, Office Action dated Feb. 12, 2015, 4 pages.

* cited by examiner

FIG. 6

| | Slot 0 | Slot 1 | |
|---|---|---|---|
| $N_{RB}^{UL}-1$ | 2/2a/2b #1 (m=1) | 2/2a/2b #0 (m=0) | |
| $N_{RB}^{UL}-2$ | 1/1a/1b #0 (m=3) | 1/1a/1b+2/2a/2b (m=2) | |
| $N_{RB}^{UL}-3$ | 1/1a/1b #2 (m=5) | 1/1a/1b #1 (m=4) | |
| $N_{RB}^{UL}-4$ | | | |
| $N_{RB}^{UL}-5$ | | | |
| ⋮ | ⋮ | ⋮ | |
| RB 4 | | | |
| RB 3 | | | |
| RB 2 | 1/1a/1b #1 (m=4) | 1/1a/1b #2 (m=5) | |
| RB 1 | 1/1a/1b+2/2a/2b(m=2) | 1/1a/1b #0 (m=3) | 12 subcarriers |
| RB 0 | 2/2a/2b #0(m=0) | 2/2a/2b #1(m=1) | |

METHOD AND APPARATUS FOR TRANSMITTING UPLINK CONTROL INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2012/001136, filed on Feb. 15, 2012, which claims the benefit of U.S. Provisional application Ser. No. 61/442,818, filed on Feb. 15, 2011, the contents of which are all hereby incorporated by reference herein in their entirety.

BACKGROUND OF THE INVENTION

1. Field of the Invention

The present invention relates to wireless communications, and more particularly, to a method and apparatus for transmitting uplink control information in a wireless communication system supporting multiple carriers.

2. Related Art

In order to maximize efficiency of limited radio resources, an effective transmission and reception scheme and methods of utilization thereof have been proposed in a broadband wireless communication system. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading. As a result, complexity is decreased in a receiving end and an interval of a transmitted symbol is increased, thereby minimizing the ISI.

In a system using the OFDM as a modulation scheme, orthogonal frequency division multiple access (OFDMA) is a multiple access scheme in which multiple access is achieved by independently providing a part of available subcarrier to each user. In the OFDMA, frequency resources (i.e., subcarriers) are provided to respective users, and the respective frequency resources do not overlap with one another in general since they are independently provided to the multiple users. Consequently, the frequency resources are allocated to the respective users in a mutually exclusive manner. In an OFDMA system, frequency diversity for the multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A carrier aggregation system has recently drawn attention. The carrier aggregation system implies a system that configures a broadband by aggregating one or more carriers having a bandwidth smaller than that of a target broadband when the wireless communication system intends to support the broadband.

Meanwhile, uplink control information (UCI) can be transmitted through an uplink control channel, i.e., a physical uplink control channel (PUCCH). The UCI can include various types of information such as a scheduling request (SR), acknowledgement/non-acknowledgement (ACK/NACK) information for hybrid ARQ (HARQ), a channel quality indicator (CQI), a precoding matrix indicator (PMI), a rank indicator (RI), etc. The PUCCH carries various types of control information according to a format.

An amount of UCI required in the carrier aggregation system is increased in comparison with a single carrier system supporting only one carrier. Therefore, there is a need for a method for effectively transmitting various types of UCI in the carrier aggregation system.

SUMMARY OF THE INVENTION

The present invention proposes a method and apparatus for transmitting uplink control information in a wireless communication system supporting multiple carriers.

According to an aspect of the present invention, there is provided a method of transmitting uplink control information (UCI), performed by a user equipment, in a carrier aggregation system in which a plurality of serving cells are aggregated. The method includes: receiving a downlink signal through at least one serving cell; generating first UCI and second UCI with respect to the downlink signal; transmitting the first UCI through a first serving cell; and transmitting the second UCI through a second serving cell, wherein the first serving cell and the second serving cell are different from each other, and the first UCI and the second UCI are different types of UCI.

In the aforementioned aspect of the present invention, the first UCI may be acknowledgement/not-acknowledgement (ACK/NACK) indicating reception confirmation for a control signal or downlink data included in the downlink signal.

In addition, the second UCI may be channel state information (CSI) generated by measuring the downlink signal.

In addition, the second UCI may be a channel quality indicator (CQI) generated by measuring a reference signal included in the downlink signal.

In addition, the method may further include receiving UCI serving cell indication information indicating the first serving cell and the second serving cell.

In addition, the UCI serving cell indication information may be received through a radio resource control (RRC) message.

In addition, the first UCI may be transmitted through a first physical uplink control channel (PUCCH) which is a control channel of the first serving cell, and the second UCI may be transmitted through a second PUCCH which is a control channel of the second serving cell.

In addition, the method may further include transmitting the first UCI through a third physical uplink shared channel (PUSCH) which is a data channel of a third serving cell, wherein the third serving cell is a serving cell selected in a serving cell group including the first serving cell.

In addition, the method may further include transmitting the second UCI through a fourth PUSCH which is a data channel of a fourth serving cell, wherein the fourth serving cell is a serving cell selected in a serving cell group including the second serving cell.

In addition, the first UCI and the second UCI may be transmitted in the same subframe of the first serving cell and the second serving cell.

In addition, a plurality of information bits constituting the first UCI or the second UCI may be spread in a time domain by using block spreading coding, and may be transmitted in a plurality of orthogonal frequency division multiplexing (OFDM) symbols in the same subframe.

In addition, a plurality of information bits constituting the first UCI may be transmitted by using a single PUCCH resource selected from a plurality of PUCCH resources and a bit value indicated by a modulation symbol transmitted using the single PUCCH resource.

According to another aspect of the present invention, there is provided an apparatus for transmitting UCI. The apparatus includes: a radio frequency (RF) unit for transmitting or receiving a radio signal; and a processor coupled to the RF unit, wherein the processor is configured for: receiving a downlink signal through at least one of the serving cells; generating first UCI and second UCI with respect to the downlink signal; transmitting the first UCI through a first serving cell; and transmitting the second UCI through a second serving cell, wherein the first UCI and the second UCI are different types of UCI.

When there is a request for simultaneously transmitting uplink control information with various types, the information can be transmitted through uplink component carriers of different serving cells, and thus transmission can be achieved effectively without a collision. Therefore, since the uplink control information can be transmitted in a reliable and effective manner, system performance can be improved.

BRIEF DESCRIPTION OF THE DRAWINGS

FIG. 6 shows a physical mapping relation of a physical uplink control channel (PUCCH) format mapped to a control region.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the 3GPP LTE.

Although the following description focuses on LTE and LTE-A for clarity, the technical features of the present invention are not limited thereto.

Figure 1:
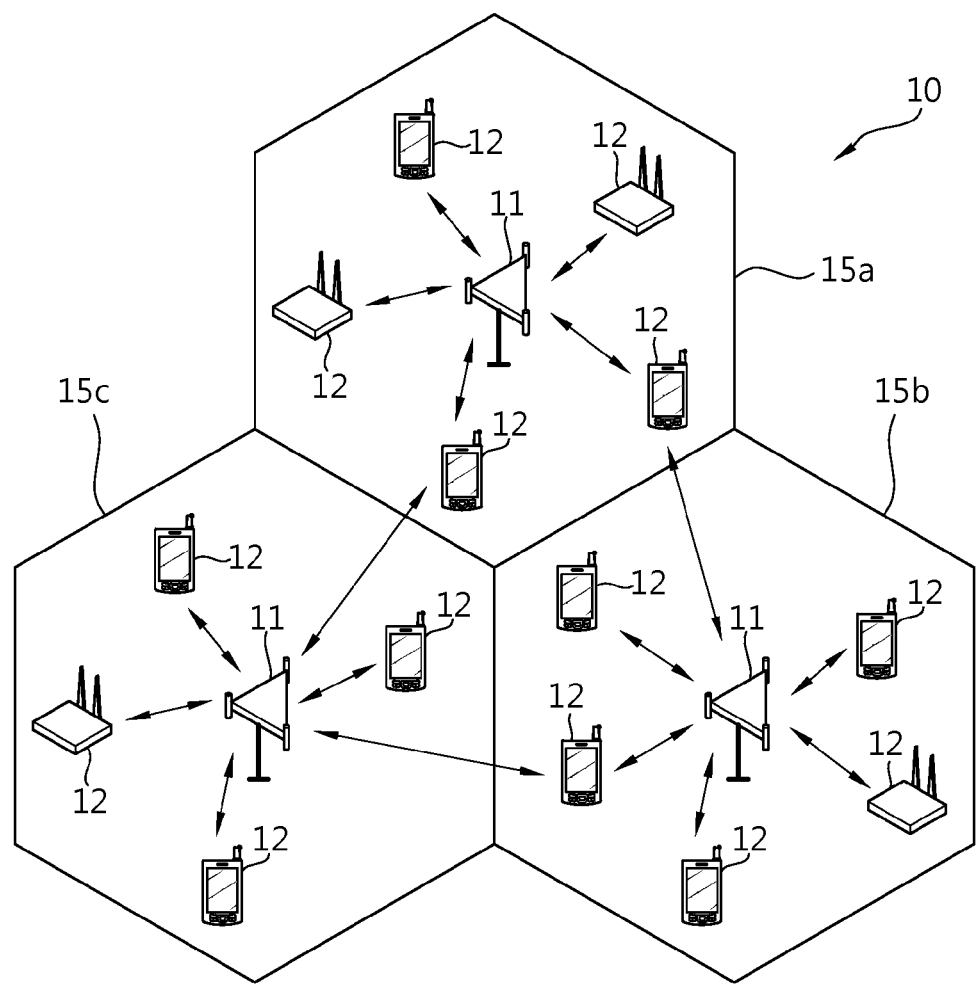
FIG. 1 shows an example of a wireless communication system.

FIG. 1 shows an example of a wireless communication system.

Referring to FIG. 1, a wireless communication system 10 includes at least one base station (BS) 11. Respective BSs 11 provide communication services to specific geographical regions 15a, 15b, and 15c. The BS 11 is generally a fixed station that communicates with a user equipment (UE) 12 and may be referred to as another terminology, such as an evolved node-B (eNB), a base transceiver system (BTS), an access point, etc.

The UE 12 may be fixed or mobile, and may be referred to as another terminology, such as a mobile station (MS), an mobile terminal (MT), a user terminal (UT), a subscriber station (SS), a wireless device, a personal digital assistant (PDA), a wireless modem, a handheld device, etc.

Hereinafter, a downlink implies communication from the BS 11 to the UE 12, and an uplink implies communication from the UE 12 to the BS 11.

Figure 2:
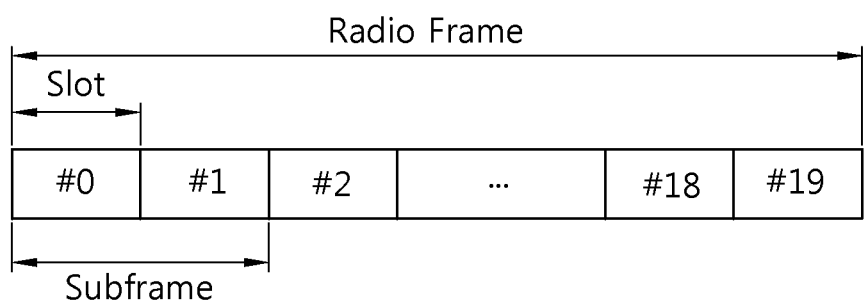
FIG. 2 shows a structure of a radio frame in 3rd generation partnership project (3GPP) long term evolution (LTE).

FIG. 2 shows a structure of a radio frame in 3GPP LTE.

This may be found in the section 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)". Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used as an uplink multiple-access scheme.

The above radio frame structure is shown for exemplary purposes only. Thus, the number of subframes included in the radio frame or the number of slots included in the subframe or the number of OFDM symbols included in the slot may change variously. For example, in 3GPP LTE, it is defined such that one slot includes 7 OFDM symbols in a normal cyclic prefix (CP) and one slot includes 6 OFDM symbols in an extended CP.

A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band.

Figure 3:
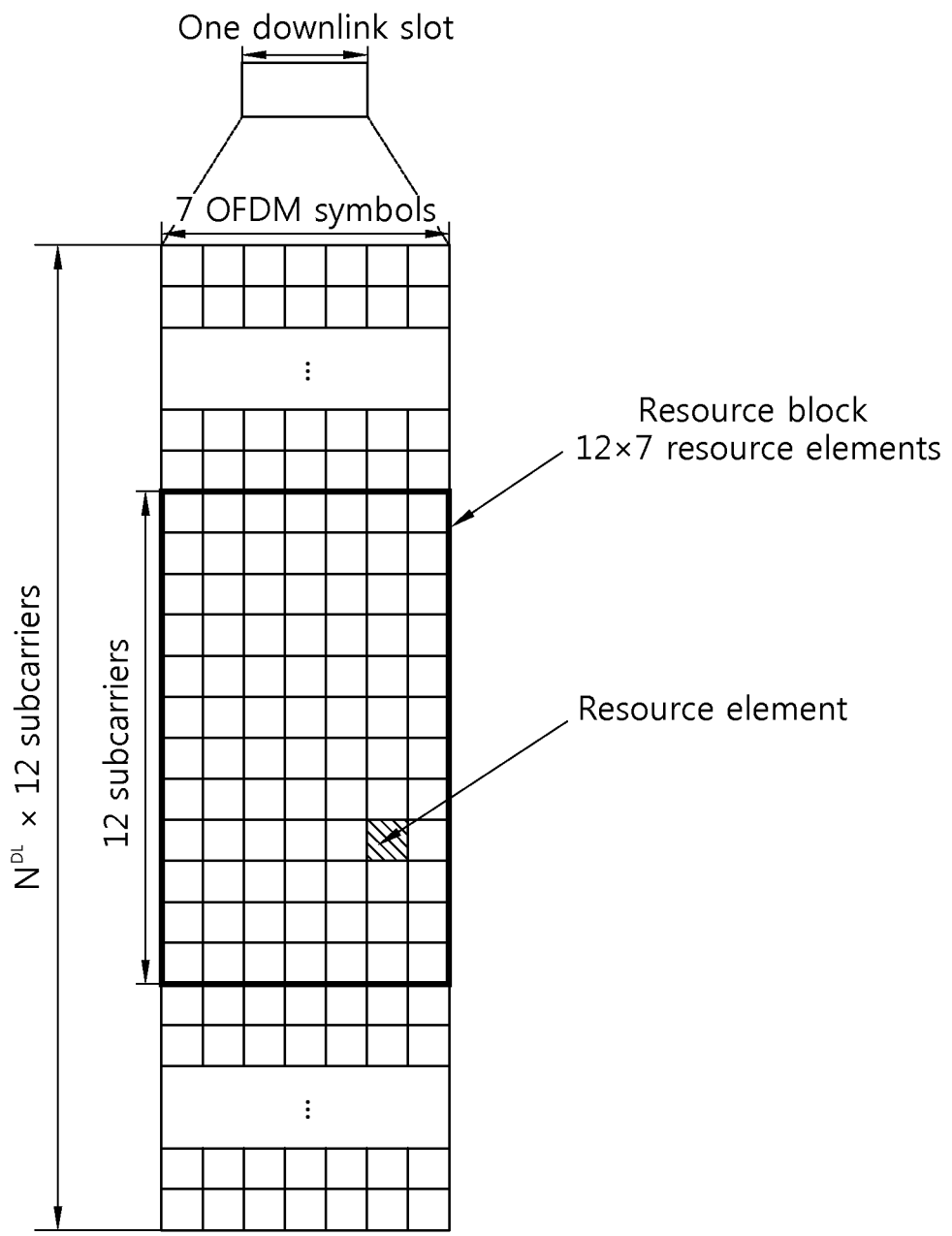
FIG. 3 shows an example of a resource grid for one downlink slot.

FIG. 3 shows an example of a resource grid for one downlink slot.

The downlink slot includes a plurality of OFDM symbols in a time domain, and includes NRB resource blocks (RBs) in a frequency domain. The number NRB of RBs included in the downlink slot depends on a downlink transmission bandwidth configured in a cell. For example, in the LTE system, NRB may be any one value in the range of 60 to 110. One RB includes a plurality of subcarriers in the frequency domain. A structure of an uplink slot may be the same as the aforementioned structure of the downlink slot.

Each element on the resource grid is referred to as a resource element. The resource element on the resource grid can be identified by an index pair (k, l) within the slot. Herein, $k(k=0, \ldots, NRB \times 12-1)$ denotes a subcarrier index in the frequency domain, and $l(l=0, \ldots, 6)$ denotes an OFDM symbol index in the time domain.

Herein, although it is described herein that one resource block includes 7×12 REs consisting of 7 OFDM symbols in the time domain and 12 subcarriers in the frequency domain for example, the number of OFDM symbols and the number of subcarriers in the resource block are not limited thereto. Thus, the number of OFDM symbols and the number of subcarriers may change variously depending on a CP length, a frequency spacing, etc. For example, the number of OFDM symbols is 7 in a normal CP case, and the number of OFDM symbols is 6 in an extended CP case. The number of subcarriers in one OFDM symbol may be selected from 128, 256, 512, 1024, 1536, and 2048.

Figure 4:
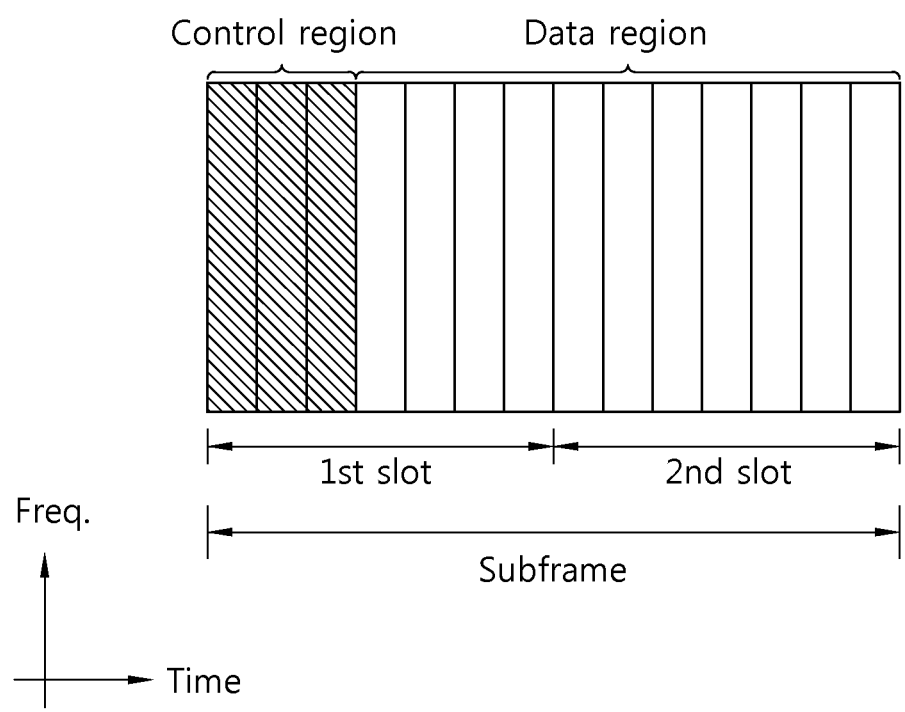
FIG. 4 shows a structure of a downlink subframe.

FIG. 4 shows a structure of a downlink subframe.

The downlink subframe includes two slots in a time domain, and each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region.

A physical downlink control channel (PDCCH) can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

A BS determines a PDCCH format according to downlink control information (DCI) to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
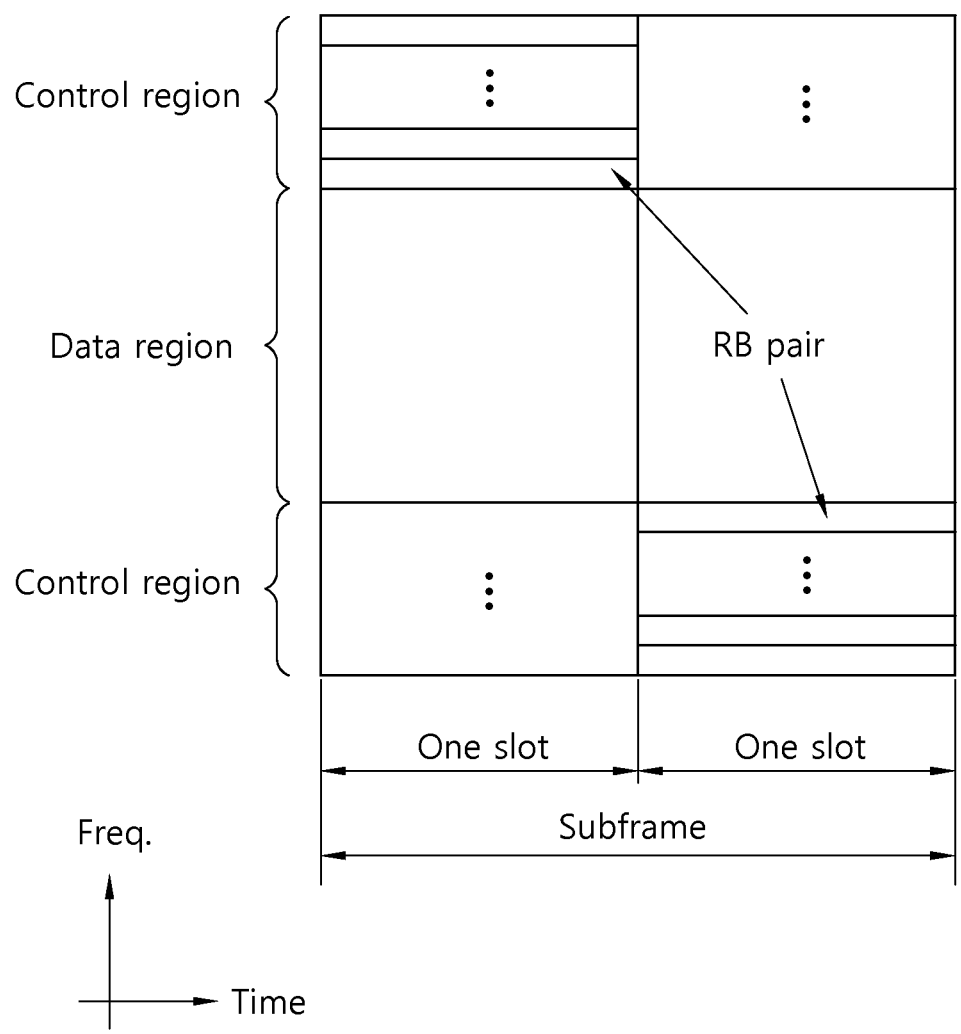
FIG. 5 shows a structure of an uplink subframe.

FIG. 5 shows a structure of an uplink subframe.

The uplink subframe can be divided into a control region and a data region. A physical uplink control channel (PUCCH) for carrying uplink control information (UCI) is allocated to the control region. A physical uplink shared channel (PUSCH) for carrying data is allocated to the data region. When indicated by a higher layer, a UE may support simultaneous transmission of the PUSCH and the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may be user information. Alternatively, the UL data may be multiplexed data. The multiplexed data may be obtained by multiplexing the UCI and a transport block for the UL-SCH. Examples of the UCI multiplexed to the data may include a CQI, a PMI, an RI, etc. The CQI provides information on a link-adaptive parameter that can be supported by the UE in a given time, and represents channel quality. The PMI provides information on a precoding matrix when performing code-based precoding. The RI is information on the number of layers recommended by the UE. That is, the RI indicates the number of streams used in spatial multiplexing. Information indicating a channel state such as a CQI, a PMI, an RI, etc., is collectively referred to as channel state information (CSI). Hereinafter, the UCI includes ACK/NACK and CSI. Alternatively, UL data may be configured only with the UCI.

Now, a PUCCH will be described.

FIG. 6 shows a physical mapping relation of a PUCCH format mapped to a control region.

Referring to FIG. 6, the PUCCH for one UE is allocated in an RB pair in a subframe. RBs belonging to the RB pair occupy different subcarriers in each of a 1st slot and a 2nd slot. A frequency occupied by the RBs belonging to the RB pair changes at a slot boundary. This is called that the RB pair allocated to the PUCCH is frequency-hopped at the slot boundary. Since the UE transmits the UCI on a time basis through different subcarriers, a frequency diversity gain can be obtained. m is a location index indicating a logical frequency-domain location of the RB pair allocated to the PUCCH in the subframe.

The PUCCH carries various types of UCI according to a format. A PUCCH format 1 carries a scheduling request (SR). In this case, an on-off keying (OOK) scheme can be used. A PUCCH format 1a carries an ACK/NACK modulated by using bit phase shift keying (BPSK) with respect to one codeword. A PUCCH format 1b carries an ACK/NACK modulated by using quadrature phase shift keying (QPSK) with respect to two codewords. A PUCCH format 2 carries a CQI modulated by using QPSK. PUCCH formats 2a and 2b carry CQI and ACK/NACK.

Table 1 shows a modulation scheme and the number of bits in a subframe according to a PUCCH format.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Table 2 shows the number of OFDM symbols used as a PUCCH demodulation reference signal per slot.

TABLE 2

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

Table 3 shows a position of an OFDM symbol to which a demodulation reference signal is mapped according to a PUCCH format.

TABLE 3

| | Set of values for l | |
|---|---|---|
| PUCCH format | Normal cyclic prefix | Extended cyclic prefix |
| 1, 1a, 1b | 2, 3, 4 | 2, 3 |
| 2, 2a, 2b | 1, 5 | 3 |

In the physical mapping relation of the PUCCH format mapped to the control region, the PUCCH formats 2/2a/2b are mapped and transmitted on the band-edge RBs (e.g., PUCCH region m=0, 1). A mixed PUCCH resource block (RB) can be transmitted by being mapped to an adjacent RB (e.g., m=2) towards a center of the band in an RB to which the PUCCH formats 2/2a/2b are allocated. PUCCH formats 1/1a/1b by which SR and ACK/NACK are transmitted can be deployed to an RB with m=4 or m=5. The number of available RBs with the PUCCH formats 2/2a/2b by which CQI is transmitted can be indicated by a UE through a broadcasting signal.

All PUCCH formats described above use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4} \quad \text{[Equation 1]}$$

In Equation 1, u denotes a root index, and n denotes a component index in the range of $0 \leq n \leq N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence r(n, Ics).

$$r(n, I_{cs}) = r(n) \cdot \exp\left(\frac{j2\pi I_{cs} n}{N}\right), \quad \text{[Equation 2]}$$
$$0 \leq I_{cs} \leq N-1$$

In Equation 2, Ics denotes a CS index indicating a CS amount ($0 \leq Ics \leq N-1$).

The available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in a PUCCH format 1b will be described.

Figure 7:
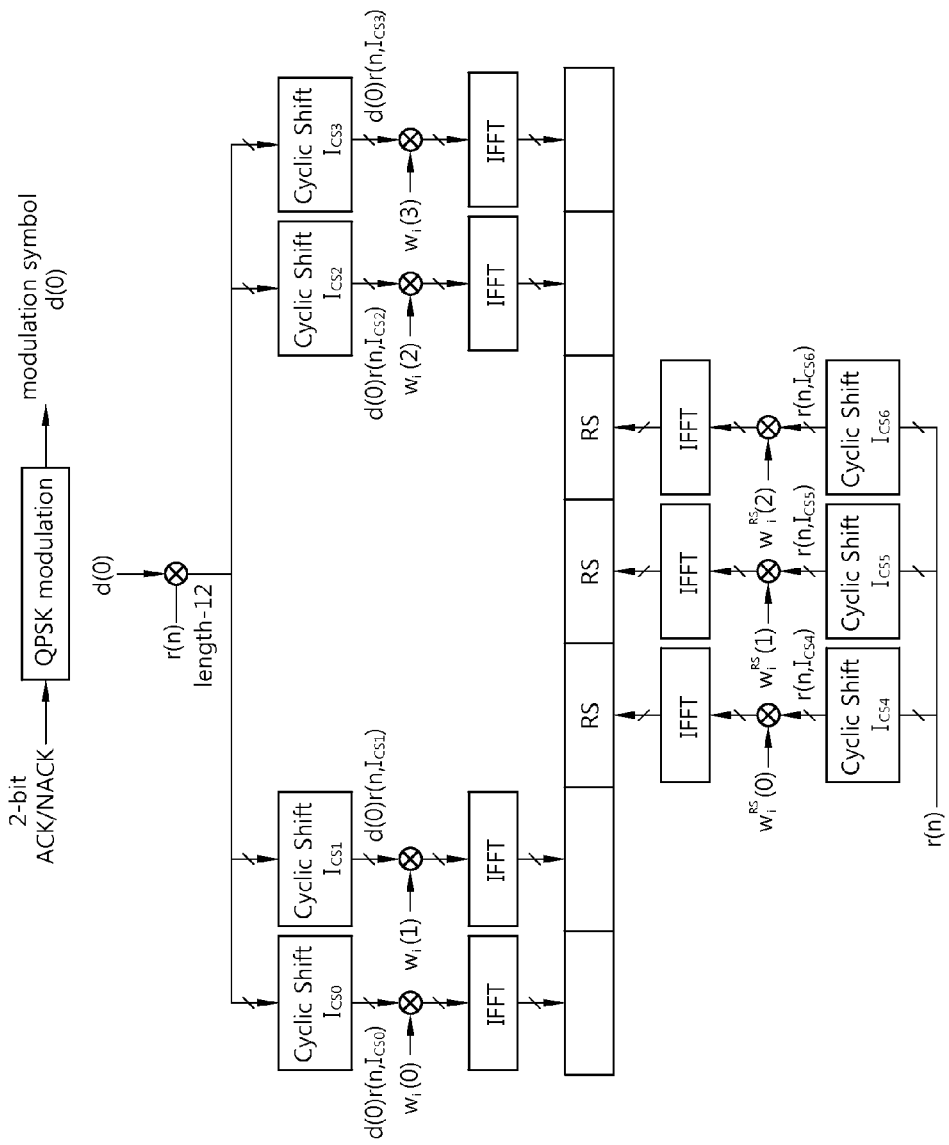
FIG. 7 shows a PUCCH format 1b in a normal cyclic prefix (CP) case.

FIG. 7 shows a PUCCH format 1b in a normal CP case.

One slot includes 7 OFDM symbols. Three OFDM symbols are used as a reference signal (RS) OFDM symbol for a reference signal. Four OFDM symbols are used as a data OFDM symbol for an ACK/NACK signal.

In the PUCCH format 1b, a modulation symbol d(0) is generated by modulating a 2-bit ACK/NACK signal based on quadrature phase shift keying (QPSK).

A CS index Ics may vary depending on a slot number ns in a radio frame and/or a symbol index 1 in a slot.

Since there are four data OFDM symbols for transmission of an ACK/NACK signal in one slot in the normal CP case, it is assumed that CS indices mapped to the respective data OFDM symbols are denoted by Ics0, Ics1, Ics2, and Ics3.

The modulation symbol d(0) is spread to a cyclically shifted sequence r(n, Ics). When a one-dimensional spreading sequence mapped to an (i+1)th OFDM symbol in a subframe is denoted by m(i), it can be expressed as follows.

{m(0), m(1), m(2), m(3)}={d(0)r(n, Ics0), d(0)r(n, Ics1), d(0)r(n, Ics2), d(0)r(n, Ics3)}

In order to increase UE capacity, the one-dimensional spreading sequence can be spread by using an orthogonal sequence. An orthogonal sequence wi(k) (where i is a sequence index, $0 \leq k \leq K-1$) having a spread factor K=4 uses the following sequence.

TABLE 4

| Index (i) | [$w_i(0), w_i(1), w_i(2), w_i(3)$] |
|---|---|
| 0 | [+1, +1, +1, +1] |
| 1 | [+1, −1, +1, −1] |
| 2 | [+1, −1, −1, +1] |

An orthogonal sequence wi(k) (where i is a sequence index, $0 \leq k \leq K-1$) having a spread factor K=3 uses the following sequence.

TABLE 5

| Index (i) | [$w_i(0), w_i(1), w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, two-dimensional spreading sequences {s(0), s(1), s(2), s(3)} can be expressed as follows.

{s(0), s(1), s(2), s(3)}={wi(0)m(0), wi(1)m(1), wi(2)m(2), wi(3)m(3)}

The two-dimensional spreading sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal of the PUCCH format 1b is also transmitted by cyclically shifting the base sequence r(n) and then by spreading it by the use of an orthogonal sequence. When CS indices mapped to three RS OFDM symbols are denoted by Ics4, Ics5, and Ics6, three cyclically shifted sequences r(n, Ics4), r(n, Ics5), and r(n, Ics6) can be obtained. The three cyclically shifted sequences are spread by the use of an orthogonal sequence wRSi(k) having a spreading factor K=3.

An orthogonal sequence index i, a CS index Ics, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index n(1)PUUCH is defined in order for the UE to obtain the three parameters for configuring the PUCCH. The resource index n(1)PUUCH is defined as nCCE+N(1)PUUCH, where nCCE is an index of a first CCE used for transmission of corresponding DCI (i.e., DL resource allocation used to receive DL data mapped to an ACK/NACK signal), and N(1)PUUCH is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index Ics, a resource block index m, and an index for obtaining the three indices. The ACK/NACK resource may include at least one of an orthogonal sequence, a cyclic shift, a resource block, and a combination thereof.

Figure 8:
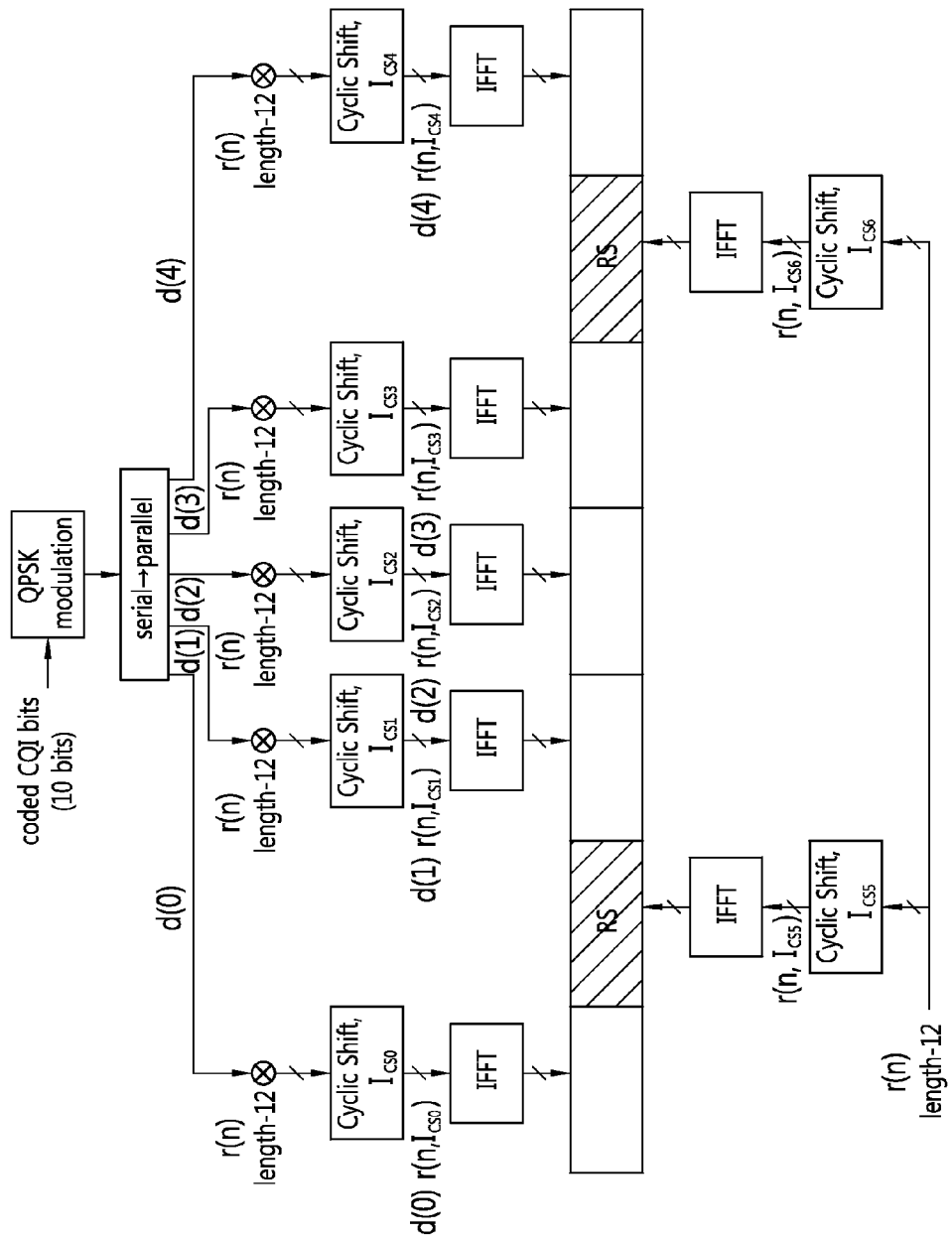
FIG. 8 shows a channel structure of PUCCH formats 2/2a/2b for one slot in a normal CP case.

FIG. 8 shows a channel structure of PUCCH formats 2/2a/2b for one slot in a normal CP case. As described above, the PUCCH formats 2/2a/2b are used in CQI transmission.

Referring to FIG. 8, in the normal CP case, OFDM symbols 1 and 5 (i.e., 2nd and 6th OFDM symbols) are used for a demodulation reference signal (DM RS) which is an uplink reference signal, and the remaining OFDM symbols are used for CQI transmission. In an extended CP case, an OFDM symbol 3 (i.e., a 4th OFDM symbol) is used for a DM RS.

10 CQI information bits are channel coded, for example, with a coding rate of ½, to generate 20 coded bits. A Reed-Muller code can be used in the channel coding. After scheduling, QPSK constellation mapping is performed to generate QPSK modulation symbols (e.g., d(0) to d(4) in a slot 0). Each QPSK modulation symbol is subjected to IFFT after being modulated by using a cyclic shift of a base RS sequence having a length of 12, and is then transmitted in each of 10 SC-FDMA symbols in a subframe. 12 equally-spaced cyclic shifts allow 12 different UEs to be orthogonally multiplexed on the same PUCCH RB. A DM RS sequence applied to the ODMA symbols 1 and 5 may be the base RS sequence having a length of 12.

In LTE, simultaneous transmission of ACK/NACK and CQI in the same subframe may be enabled or disabled. In a case where simultaneous transmission of the ACK/NACK and the CQI is disabled, a UE may need to transmit the ACK/NACK on a PUCCH of a subframe in which CQI feedback is configured. In this case, the CQI is dropped, and only the ACK/NACK is transmitted using the PUCCH formats 1a/1b.

Simultaneous transmission of the ACK/NACK and the CQI in the same subframe can be achieved through UE-specific higher layer signaling. When simultaneous transmission is enabled, 1-bit or 2-bit ACK/NACK information needs to be multiplexed to the same PUCCH RB in a subframe in which a BS scheduler permits simultaneous transmission of the CQI and the ACK/NACK. In this case, it is necessary to preserve a single-carrier property having a low cubic metric (CM). A method of multiplexing the CQI and the ACK/NACK while preserving the single-carrier property is different between a normal CP case and an extended CP case.

First, when 1-bit or 2-bit ACK/NACK and CQI are transmitted together by using the PUCCH formats 2a/2b in the normal CP case, ACK/NACK bits are not scrambled, and are subjected to BPSK (in case of 1 bit)/QPSK (in case of 2 bits) modulation to generate a single HARQ ACK/NACK modulation symbol dHARQ. The ACK is encoded as a binary '1', and the NACK is encoded as a binary '0'. The single HARQ ACK/NACK modulation symbol dHARQ is used to modulate a second RS symbol in each slot. That is, the ACK/NACK is signaled by using an RS.

Figure 9:
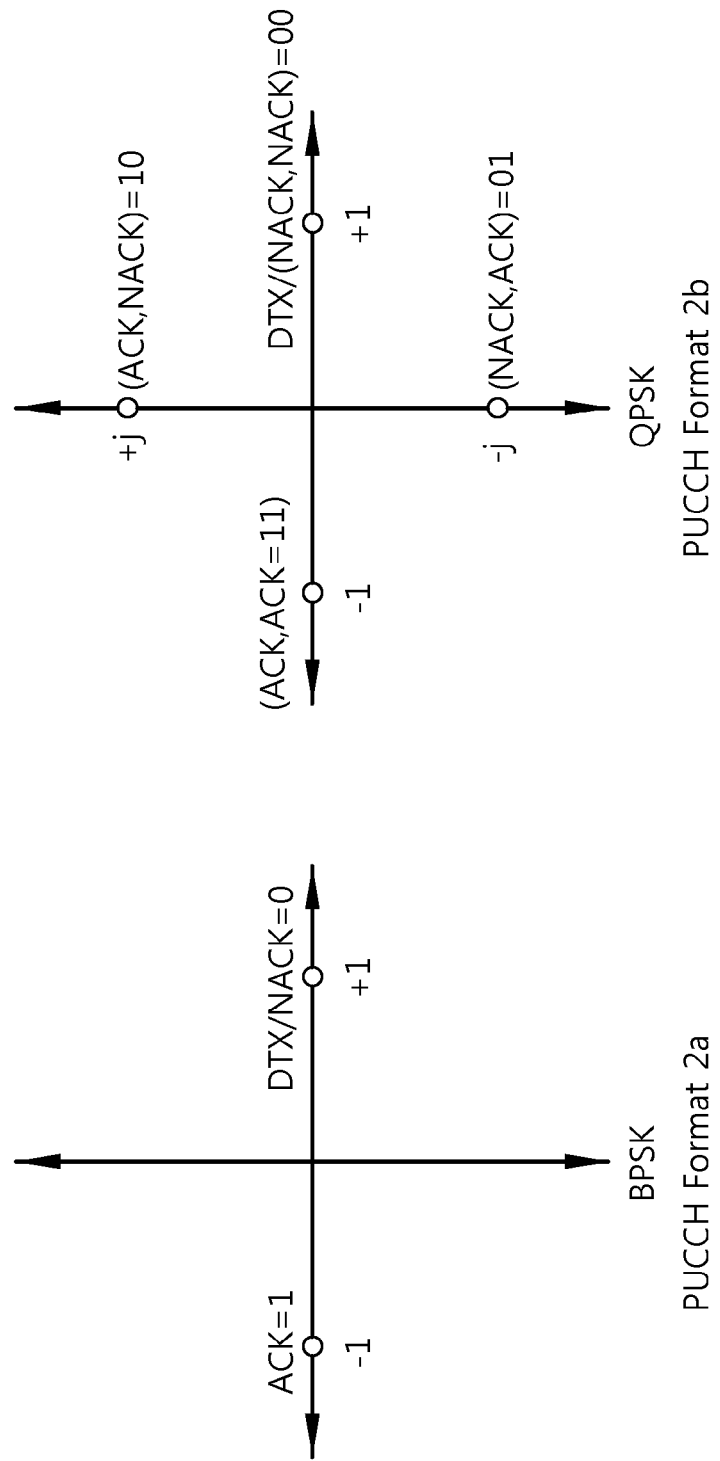
FIG. 9 shows an example of constellation mapping of acknowledgement/not-acknowledgement (ACK/NACK) in a normal CP case when ACK/NACK is signaled using a reference signal (RS).

FIG. 9 shows an example of constellation mapping of ACK/NACK in a normal CP case when ACK/NACK is signaled using an RS.

Referring to FIG. 9, ACK is encoded with a binary number '1' (or encoded with '11' in case of ACK, ACK), and NACK is encoded with a binary number '0' (or encoded with '00' in case of NACK, NACK). Thereafter, ACK (or ACK, ACK) is constellation mapped to −1, and NACK (or ACK/NACK in case of transmission of two DL codewords) is constellation mapped to +1. (ACK, NACK) is constellation mapped to +j, and (NACK, ACK) is constellation mapped to −j. An ACK/NACK modulation symbol modulated in this manner is used to modulate a 2nd RS symbol of each slot in which CQI is transmitted. In discontinuous transmission (DTX) which implies a case where a UE fails to detect a DL grant, neither ACK nor NACK is transmitted, and a default NACK is set in this case. The DTX is interpreted as NACK by a BS, and causes DL retransmission.

Next, 1- or 2-bit ACK/NACK is jointly coded with CQI in an extended CP case in which one RS symbol is used per slot.

Figure 10:
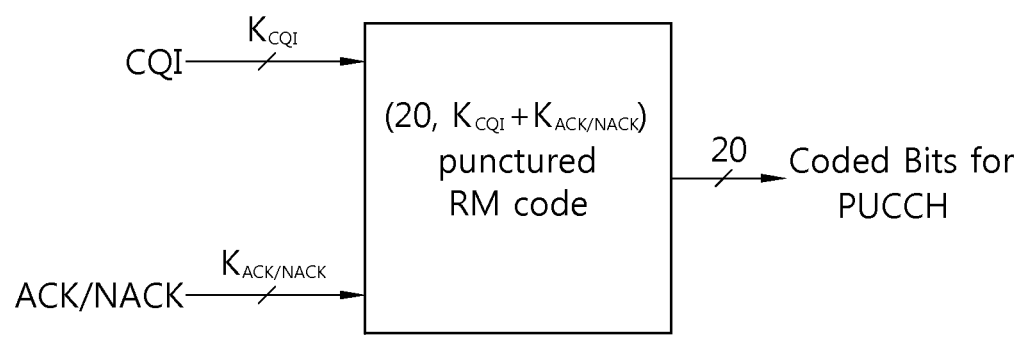
FIG. 10 shows an example of joint coding between ACK/NACK and a channel quality indicator (CQI) in an extended CP case.

FIG. 10 shows an example of joint coding between ACK/NACK and CQI in an extended CP case.

Referring to FIG. 10, a maximum number of bits of an information bit supported by a block code may be 13. In this case, a CQI information bit Kcqi may be 11 bits, and an ACK/NACK bit KACK/NACK may be 2 bits. The CQI information bit and the ACK/NACK information bit are jointly encoded to generate a 20-bit Reed Muller (RM)-based block code. The 20-bit codeword generated in this process is transmitted through a PUCCH having the channel structure described in FIG. 7 (in an extended CP case, one RS symbol is used per slot unlike in FIG. 7).

Table 6 below shows an example of a (20, A) RM code used in channel coding of uplink control information (UCI) of 3GPP LTE. Herein, A may denote the number of bits (i.e., Kcqi+KACK/NACK) of a bit-stream linked with a CQI information bit and an ACK/NACK information bit. If the bit-stream is denoted by a0, a1, a2, . . . , aA−1, the bit-stream can be used as an input of a channel coding block using the (20, A) RM code.

TABLE 6

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel encoded bits b0, b1, b2, . . . , bB−1 can be generated by Equation 3 below.

$$b_i = \sum_{n=0}^{A-1} (a_n \cdot M_{i,n}) \bmod 2 \qquad \text{[Equation 3]}$$

In Equation 3, i=0, 1, 2, . . . , B−1.

Meanwhile, a wireless communication system may be a carrier aggregation system. Herein, carrier aggregation is when a broadband is configured by aggregating one or more carriers having a smaller bandwidth than the broadband. The carrier aggregation system can configure a broadband by aggregating one or more component carriers (CCs) having a bandwidth smaller than that of a target broadband when the wireless communication system intends to support the broadband.

Figure 11:
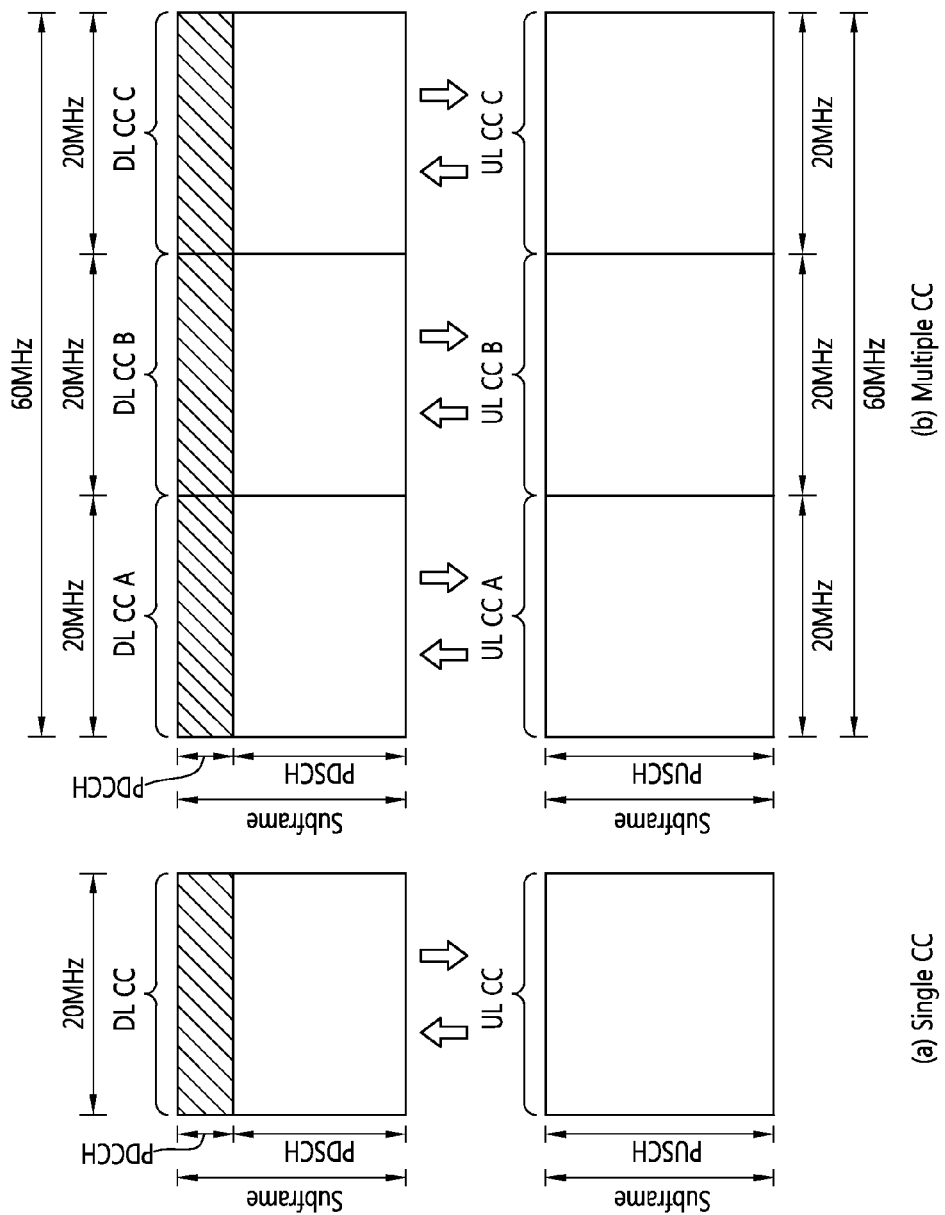
FIG. 11 shows an example of comparing a single-carrier system and a carrier aggregation system.

FIG. 11 shows an example of comparing a single-carrier system and a carrier aggregation system.

Referring to FIG. 11, only one carrier is supported for a UE in an uplink and a downlink in the single-carrier system. The carrier may have various bandwidths, but only one carrier is assigned to the UE. Meanwhile, multiple component carriers (CCs) (i.e., DL CCs A to C and UL CCs A to C in FIG. 11) can be assigned to the UE in the carrier aggregation system. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE. The deactivation implies that transmission or reception of traffic data is impossible and measurement or transmission/reception of minimum information is possible.

Meanwhile, a cell can be classified into a primary cell, a secondary cell, a serving cell, etc.

When carrier aggregation is configured, the UE has only one RRC connection with the network. The primary cell implies one serving cell which provides a security input in an RRC connection establishment procedure/connection re-establishment procedure/handover procedure performed by the UE with respect to the BS.

The secondary cell implies a cell that operates at a secondary frequency. Once an RRC connection is established, the secondary cell is used to provide an additional radio resource.

The serving cell is configured with the primary cell in case of a UE of which CA is not configured or which cannot provide the CA. If the CA is configured, the term 'serving cell' is used to indicate a cell configured for the UE, and the cell may be plural in number. A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in either an activation state or a deactivation state. A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can change by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection process. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC (carrier #0)+20 MHz CC (carrier #1)+20 MHz CC (carrier #2)+20 MHz CC (carrier #3)+5 MHz CC (carrier #4).

As described above, the carrier aggregation system can support multiple component carriers (CCs) unlike a single carrier system. That is, one UE can receive multiple PDSCHs through multiple DL CCs. In addition, the UE can transmit ACK/NACK for multiple PDSCHs through one UL CC (e.g., UL PCC). That is, since only one PDSCH is received in one subframe in the conventional single carrier system, it was enough to transmit only up to two pieces of HARQ ACK/NACK (hereinafter, simply referred to as ACK/NACK for convenience of explanation) information. However, since the carrier aggregation system can transmit ACK/NACK for multiple PDSCHs through one UL CC, there is a need for a method of transmitting ACK/NACK.

1. Channel selection using the PUCCH Format 1b based on PUCCH resource selection (hereinafter, simply called channel selection). This method is also called ACK/NACK multiplexing or ACK/NACK selection.

In this method, a plurality of ACK/NACK signals are transmitted by allocating a plurality of PUCCH resources capable of transmitting ACK/NACK and by transmitting a modulation symbol in one PUCCH resource among the allocated plurality of PUCCH resources.

That is, in the channel selection, ACK/NACK contents are determined by combining a QPSK modulation symbol and a PUCCH resource used in ACK/NACK transmission. Table 7 below shows an example of the ACK/NACK contents determined according to 2-bit information indicated by the PUCCH resource and the modulation symbol in use.

TABLE 7

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 7, HARQ-ACK(i) indicates whether a data unit i (i=0, 1, 2, 3) is confirmed as ACK/NACK. The data unit may imply a codeword, a transport block, or a PDSCH. DTX indicates that a receiving end fails to detect a presence of the data unit. n(1)PUCCH, X indicates a PUCCH resource used in ACK/NACK transmission. In Table 7, x is any one of values 0, 1, 2, and 3. The UE transmits 2-bit (i.e., b(0) and b(1)) information identified by a QPSK modulation symbol in one PUCCH resource selected from a plurality of allocated PUCCH resources. Then, the BS can know whether each data unit is successfully received by using a combination of the QPSK modulation symbol and a PUCCH resource used for actual ACK/NACK transmission. For example, if the UE successfully receives 4 data units and then decodes the data units, the UE transmits 2 bits (i.e., (1, 1)) by using n(1) PUCCH, 1.

As such, channel selection enables ACK/NACK transmission for the multiple data units by using a single PUCCH resource according to a method in which the content (or meaning) of ACK/NACK is linked to a combination of a PUCCH resource and the content of an actual bit transmitted using the PUCCH resource. In the channel selection, if at least one ACK exists for all data units, NACK and DTX are basically indicated by coupling them as NACK/DTX. This is because a combination of a PUCCH resource and a QPSK symbol is not enough to cover all ACK/NACK combinations based on decoupling of the NACK and the DTX.

Channel selection is applicable to an LTE TDD system and an LTE-A FDD system. For example, in the LTE TDD system, a UE can receive a plurality of PDSCHs in a plurality of DL subframes, and can transmit ACK/NACK for the plurality of PDSCHs in one UL subframe coupled to the plurality of DL subframes. In this case, the UE performs channel selection by using an implicit PUCCH resource linked to a lowest CCE index of a PDCCH for scheduling each PDSCH. In the LTE-A FDD system, ACK/NACK for a plurality of PDSCHs received through a plurality of DL CCs is transmitted through one UL CC configured in a UE-specific manner. For this, channel selection is performed by using a combination of an implicit PUCCH resource linked to a PDCCH for scheduling some or all DL CCs or an explicit PUCCH resource reserved for each UE by using the implicit PUCCH resource and RRC signaling.

2. Multi-Bit ACK/NACK Coding

Herein, multi-bit ACK/NACK implies an ACK/NACK bit for multiple PDSCHs (also including a PDCCH requiring an ACK/NACK response). If a UE operates in an SU-MIMO mode in a DL CC and receives two codewords, then ACK/ACK, ACK/NACK, NACK/ACK, and NACK/NACK are present for the two codewords with respect to the DL CC, and if DTX is included as a message indicating that the PDCCH is not received, 5 feedback states are present in total. If the UE does not operate in the SU-MIMO mode and receives only one codeword, three feedback states (i.e., ACK, NACK, DTX) are present. Therefore, if the UE configures up to 5 DL CCs and operates in the SU-MIMO mode in all DL CCs, up to 55 (=3125) feedback states are present. This can be expressed by 12 bits. Alternatively, if NACK and DTX are mapped to the same feedback state in all DL CCs, up to 45 feedback states are present, which can be expressed by 10 bits. As such, a method of transmitting multi-bit ACK/NACK for multiple PDSCHs may use any one of two methods described below.

Method 2-1: Method Based on PUCCH Format 2

In this method, multi-bit ACK/NACK information on a PUSCH of multiple DL CCs is transmitted based on the PUCCH format 2.

Figure 12:
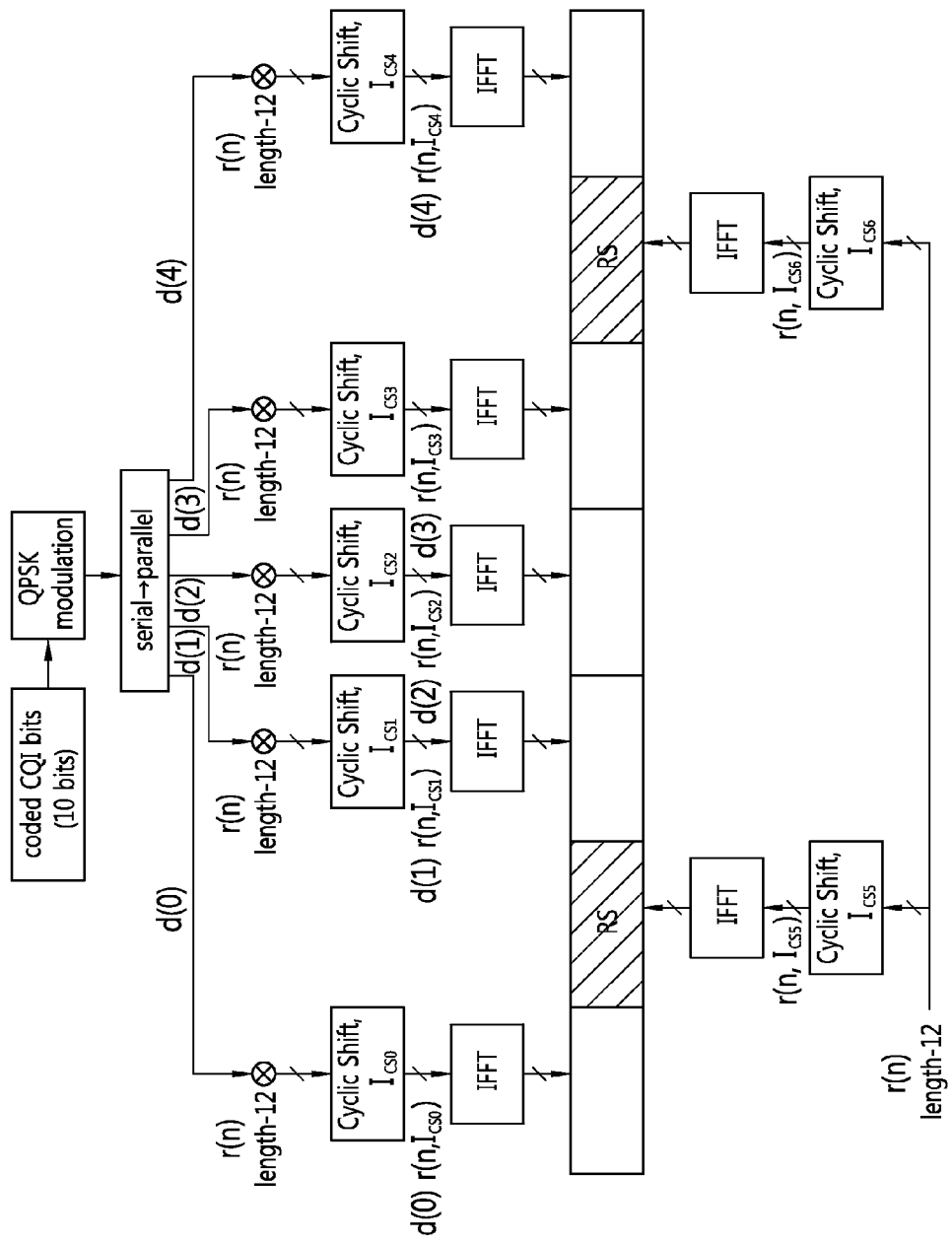
FIG. 12 shows an ACK/NACK transmission method based on a PUCCH format 2.

FIG. 12 shows an ACK/NACK transmission method based on the PUCCH format 2.

Referring to FIG. 12, a multi-bit ACK/NACK information bit (e.g., a 10-bit ACK/NACK information bit) is channel coded, for example, with a coding rate of ½, to generate 20 ACK/NACK coded bits. A Reed-Muller (RM) code can be used in the channel coding. The RM code may be found in Table 6 above. QPSK constellation mapping is performed on the ACK/NACK coded bit to generate QPSK modulation symbols (e.g., d(0) to d(4) in a slot 0). Each QPSK modulation symbol is modulated by using a cyclic shift Ics of a base RS sequence r(n) having a length of 12, and is then subjected to OFDM modulation. Then, the resultant symbol is transmitted in each of 10 ODMA symbols in a subframe. 12 equally-spaced cyclic shifts allow 12 different UEs to be orthogonally multiplexed on the same PUCCH RB. A DM RS sequence applied to the OFMA symbols 1 and 5 may be the base RS sequence having a length of 12.

Method 2-2: Method Based on Block Spreading

The method based on block spreading implies a method of multiplexing a modulation symbol sequence obtained by modulating a multi-bit ACK/NACK by the use of a block spreading code. The method based on the block spreading can use an SC-FDMA scheme. Herein, the SC-FDMA scheme is a transmission scheme in which IFFT is performed after DFT spreading is performed. The SC-FDMA is also called DFT-spread OFDM (DFT-s OFDM). A peak-to-average power ratio (PAPR) or a cubic metric (CM) can be decreased in the SC-FDMA. The method based on block spreading can be used to multiplex the multi-bit ACK/NACK for multiple UEs in the same resource block.

Figure 13:
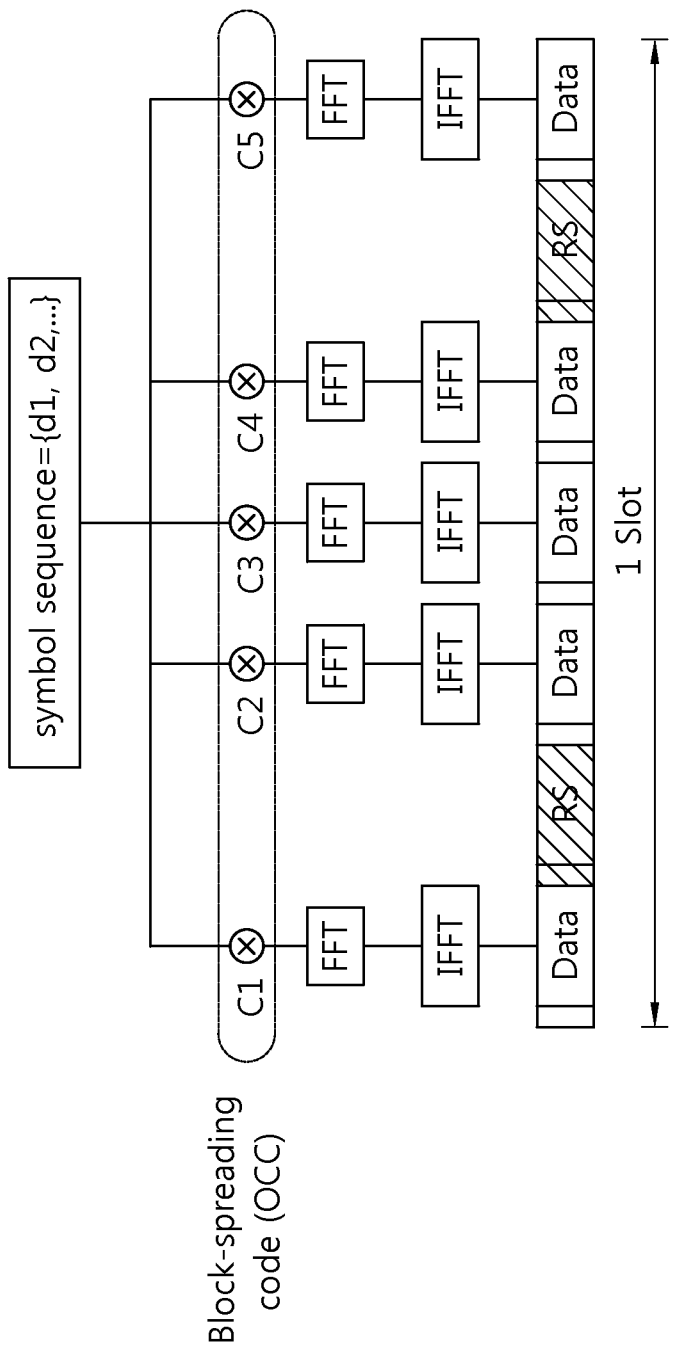
FIG. 13 shows an example of an enhanced (E)-PUCCH format based on block spreading.

FIG. 13 shows an example of an enhanced (E)-PUCCH format based on block spreading. The E-PUCCH format is also called a PUCCH format 3.

Referring to FIG. 13, the E-PUCCH format is a PUCCH format which uses a block spreading scheme. As described above, the block spreading scheme implies a method of multiplexing a modulation symbol sequence obtained by modulating multi-bit ACK/NACK by the use of a block spreading code. The block spreading scheme may use an SC-FDMA scheme. Herein, the SC-FDMA scheme implies a transmission method in which IFFT is performed after performing DFT spreading.

In the E-PUCCH format, a symbol sequence (e.g., an ACK/NACK symbol sequence) is transmitted by being spread in a time domain by the block spreading code. An orthogonal cover code (OCC) may be used as the block spreading code. Control signals of several UEs may be multiplexed by the use of the block spreading code. In the PUCCH format 2, one symbol sequence is transmitted across a time domain, and UE multiplexing is performed by using a cyclic shift of a constant amplitude zero auto-correlation (CAZAC) sequence. On the other hand, in the E-PUCCH format, a symbol sequence consisting of one or more symbols is transmitted across a frequency domain of each data symbol, and UE multiplexing is performed by being spread in the time domain by the use of a block spreading code. Although an example of using two RS symbols in one slot is exemplified in FIG. 13, the present invention is not limited thereto, and thus three RS symbols can be used and an OCC having a spreading factor of 4 can be used. The RS symbol can be generated from a CAZAC sequence having a specific cyclic shift, and can be transmitted in a format in which a plurality of RS symbols of the time domain are multiplied by a specific OCC.

A plurality of serving cells can be aggregated in the LTE-A TDD system. Therefore, a plurality of ACK/NACKs for PDSCHs of a plurality of DL subframes received through a plurality of serving cells can be transmitted in one UL subframe coupled to the plurality of DL subframes. In this case, it is possible to transmit a plurality of ACK/NACKs corresponding to the maximum number of codewords that can be transmitted through a DL subframe of all serving cells allocated to a UE (more specifically, all allocated DL CCs), or it is possible to transmit ACK/NACKs by decreasing the total number of transmission ACK/NACKs by applying ACK/NACK bundling. The ACK/NACK bundling is a process of combining ACK/NACK bits for multiple data units by using a logical AND operation. For example, if the UE decodes all of the multiple data units successfully, the UE transmits only one ACK bit. Otherwise, if the UE fails in decoding (or detecting) of any one of the multiple data units, the UE may transmit NACK or may transmit no signal as ACK/NACK. ACK/NACK bundling can be performed per codeword, serving cell, or subframe. The per-codeword bundling implies ACK/NACK bundling performed per codeword in a DL subframe of each serving cell. The per-serving cell bundling implies ACK/NACK bundling performed on the same DL subframe of all serving cells or some serving cells. The per-subframe bundling implies ACK/NACK bundling performed on all or some DL subframes with respect to a specific serving cell or all serving cells. The per-subframe bundling may use an ACK counter scheme which reports the number of all ACKs (or some ACKs) of per-serving cell ACK with respect to a PDCCH including a DL grant or all PDSCHs received for respective serving cells.

The aforementioned multi-bit ACK/NACK coding or channel selection can be applied according to a size of per-UE ACK/NACK information bit, that is, an ACK/NACK payload size.

In a single-carrier system such as LTE, only ACK/NACK information exists for one carrier. If an ACK/NACK transmission time overlaps with a CSI (e.g., CQI) transmission time, as described above, ACK/NACK may be transmitted through joint coding or reference signal (RS) modulation of a PUCCH format in which CQI is transmitted. The RS modulation is used in a normal CP case, and the joint coding is used in an extended CP case.

Meanwhile, in a multiple carrier system such as LTE-A, a plurality of ACK/NACKs for a plurality of serving cells (more specifically, a plurality of CCs) can be transmitted. For this, ACK/NACK selection or multi-bit ACK/NACK coding based on the E-PUCCH format is taken into consideration.

Considering that a situation in which ACK/NACK is transmitted by using two methods such as the aforementioned multi-bit ACK/NACK coding or ACK/NACK selection, there may be a method of transmitting only ACK/NACK while dropping CQI transmission when an ACK/NACK transmission time overlaps with a CQI transmission time based on the PUCCH format 2. This is because ACK/NACK performance may deteriorate in otherwise cases, for example, where a plurality of pieces of ACK/NACK information for a plurality of CCs are transmitted together with CQI through joint coding or RS modulation of a PUCCH format 2 in which CQI is transmitted similarly to a method of a single carrier system.

However, if CQI transmission is dropped unconditionally when the ACK/NACK transmission time overlaps with the CSI (e.g., CQI) transmission time, the BS may experience downlink scheduling delay and performance deterioration due to shortage of CQI information.

Now, a method of transmitting UCI such as ACK/NACK and CSI in a multiple carrier system is described.

Figure 14:
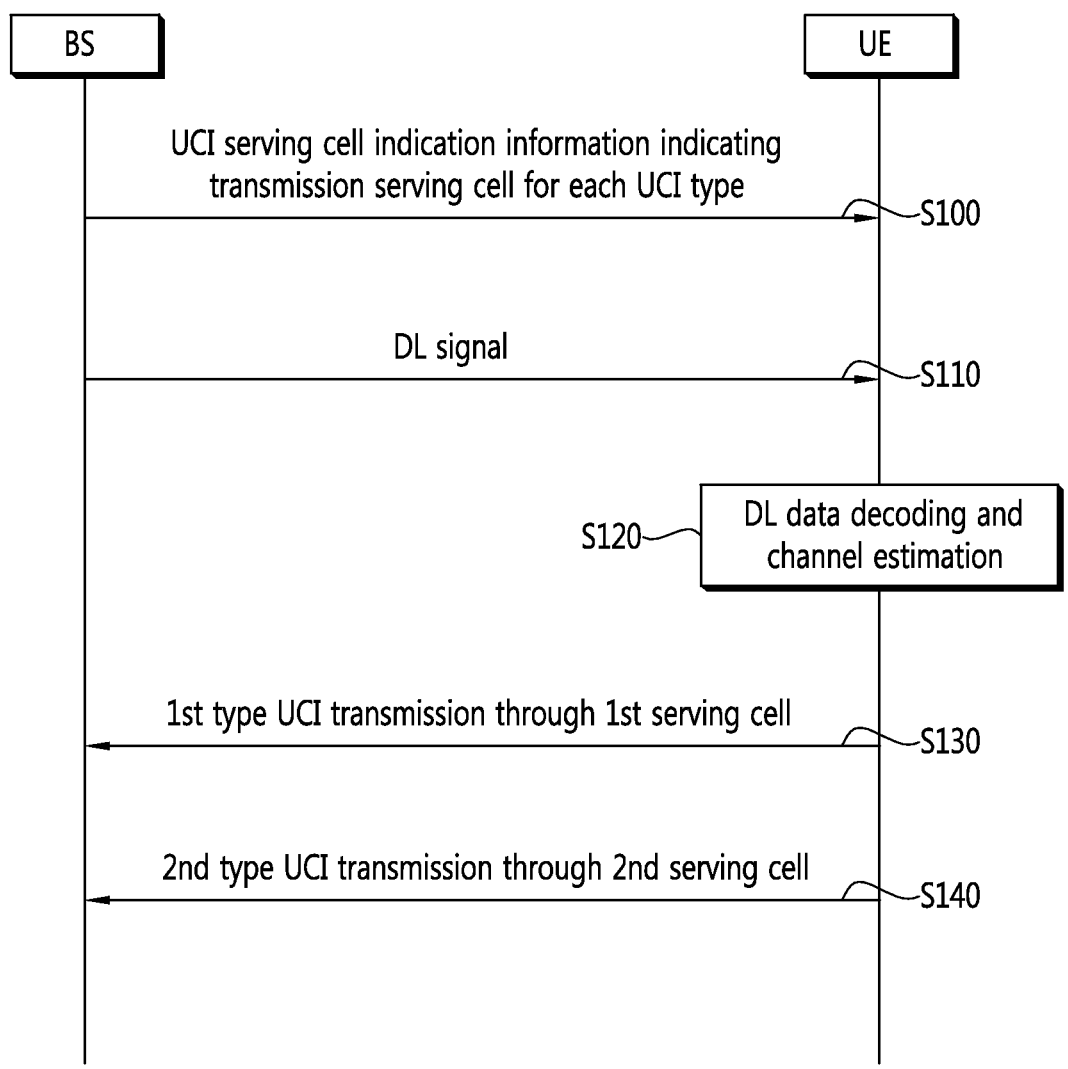
FIG. 14 shows a UCI transmission method in a multiple carrier system according to an embodiment of the present invention.

FIG. 14 shows a UCI transmission method in a multiple carrier system according to an embodiment of the present invention. It is assumed that a 1st serving cell and a 2nd serving cell are allocated to a UE.

Referring to FIG. 14, a BS transmits information indicating a transmission serving cell for each UCI type to the UE (step S100). The information indicating the transmission serving cell for each UCI type is called UCI serving cell indication information. That is, the UCI serving cell indication information is information indicating a serving cell in which UCI is transmitted for each UCI type.

For example, the UCI serving cell indication information may indicate that 1st type UCI (e.g., ACK/NACK and/or SR) is transmitted through the 1st serving cell, and 2nd type UCI (e.g., CQI, PMI, RI) is transmitted through the 2nd serving cell. That is, a serving cell (more specifically, a UL CC constituting a serving cell) for managing different types of UCI transmission is configured by using the UCI serving cell indication information among a plurality of serving cells. When each serving cell uses FDD, it can be instructed such that each serving cell uses different UCI. In addition, if each serving cell uses TDD, it can be configured such that a plurality of serving cells manage transmission of different UCIs. For example, the 1st serving cell may be a primary cell, and the 2nd serving cell may be a secondary cell. However, the present invention is not limited thereto, and thus various modified examples are also possible. That is, both of the 1st serving cell and the 2nd serving cell can be selected from secondary cells.

The UCI serving cell indication information can also indicate the 1st serving cell and the 2nd serving cell only for a case where the aforementioned UCIs are transmitted through a PUCCH. In other words, the UCI may be transmitted according to the conventional method of the multiple carrier system if the UCIs are transmitted through the PUSCH, and a specific type UCI may be transmitted through the 1st serving cell and the 2nd serving cell only when transmitted through the PUCCH.

The UCI serving cell indication information can be transmitted through a higher layer signal such as an RRC message.

The BS transmits a DL signal to the UE (step S110). The DL signal may include data transmitted through a PDSCH, and a PDCCH for requesting an ACK/NACK response.

The UE measures the DL data and channel (step S120), thereafter transmits 1st type UCI through a 1st serving cell (step S130), and transmits 2nd type UCI through a 2nd serving cell (step S140). For example, the UE can transmit ACK/NACK for PDSCH/PDCCH, transmitted or scheduled through all DL CCs of all serving cells, through a UL CC of the 1st serving cell, and can transmit CQI for all DL CCs of all serving cells through a UL CC of the 2nd serving cell. In this case, the 1st type UCI and the 2nd type UCI can be transmitted at the same time of the 1st serving cell and the 2nd serving cell, that is, can be transmitted simultaneously in the same subframe.

According to this method, there is no case where ACK/NACK transmission and CSI transmission are requested at the same time through the same serving cell (more specifically, the same UL CC). This is because ACK/NACK transmission and CSI transmission are not performed in the same serving cell. Therefore, since there is no case of dropping transmission of CSI such as CQI, it is possible to avoid system performance deterioration caused by dropping of CSI transmission.

In the above example, the 1st serving cell for transmitting ACK/NACK and the 2nd serving cell for transmitting CSI may belong to different serving cell groups. In addition, each serving cell group may consist of one or more serving cells.

Although CQI is described hereinafter as an example of CSI, the present invention is not limited thereto.

Figure 15:
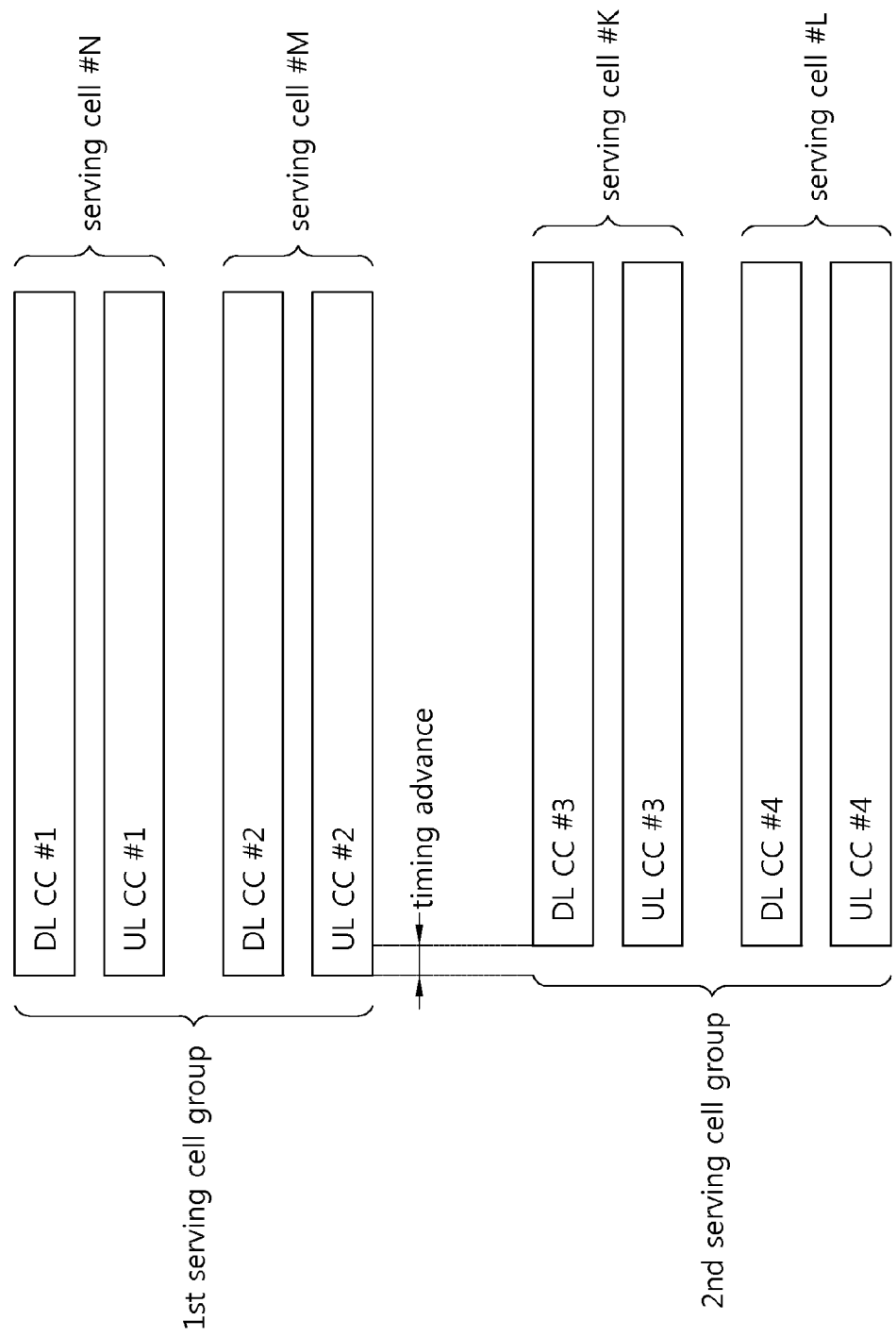
FIG. 15 shows an example of selecting a serving cell for transmitting a specific type of UCI.

FIG. 15 shows an example of selecting a serving cell for transmitting a specific type of UCI.

Referring to FIG. 15, serving cells #N, M, K, and L may be allocated to a UE. In this case, a 1st serving cell group may include the serving cells #N and M, and a 2nd serving cell group may include the serving cells #K and L. The respective serving cell groups may be separated from each other by a frequency interval significantly greater than a frequency band occupied by one CC. In addition, a plurality of CCs included in one serving cell group may be separated from each other by a frequency interval significantly smaller than a frequency interval between serving cell groups.

In this case, a serving cell for transmitting ACK/NACK (e.g., the 1st serving cell) and a serving cell for transmitting CQI (e.g., the 2nd serving cell) may be selected from different serving cell groups.

Each serving cell group may have different timings. That is, the serving cell groups may not be mutually sorted.

A serving cell for transmitting ACK/NACK may transmit ACK/NACK by using either multi-bit ACK/NACK coding based on an E-PUCCH format or ACK/NACK selection based on PUCCH formats 1/1a/1b.

A serving cell for transmitting CQI may transmit CQI through the PUCCH formats 2/2a/2b, the E-PUCCH format, or a PUSCH. The transmitting of the CQI through the PUSCH may be used in a case where CQI is transmitted simultaneously for a plurality of serving cells (i.e., a DL CC of the plurality of serving cells).

If ACK/NACK is transmitted in a piggyback manner through the PUSCH, the PUSCH may be selected from PUSCHs transmitted through a UL CC of a serving cell selected in a serving cell group including a serving cell for transmitting the ACK/NACK. For example, in FIG. 15, if a serving cell #N is a serving cell for managing ACK/NACK transmission, ACK/NACK piggyback transmission may be performed by selecting one of UL CCs #1 and 2 included in the serving cells #N and M.

In addition, if CQI is transmitted in a piggyback manner through a PUSCH, the PUSCH on which the CQI is piggybacked can be selected from PUSCHs transmitted through a UL CC of a serving cell selected in a serving cell group including a serving cell for transmitting the CQI. For example, in FIG. 15, if a serving cell #K is a serving cell for managing CQI transmission, CQI piggyback transmission may be performed by selecting one of UL CCs #3 and 4 included in the serving cells #K and L.

Therefore, a type of an uplink channel for transmitting UCI may be different according to whether a PUSCH is transmitted for each serving cell group.

For example, it is assumed in FIG. 15 that a UL CC for managing PUCCH transmission of ACK/NACK is a UL CC #1 of a serving cell #N, and a UL CC for managing PUCCH transmission of CQI is a UL CC #3 of a serving cell #K. In addition, it is also assumed that PUSCH transmission is scheduled (for example, in a UL CC #2) in a 1st serving cell group at a specific time, but PUSCH transmission is not scheduled in a 2nd serving cell group. If ACK/NACK transmission and CQI transmission are both scheduled at the specific time, ACK/NACK is transmitted in a piggyback manner through a PUSCH transmitted through the UL CC #2, but CQI is transmitted through a PUCCH of a UL CC #3. That is, UCI is transmitted through different types of uplink channels.

Figure 16:
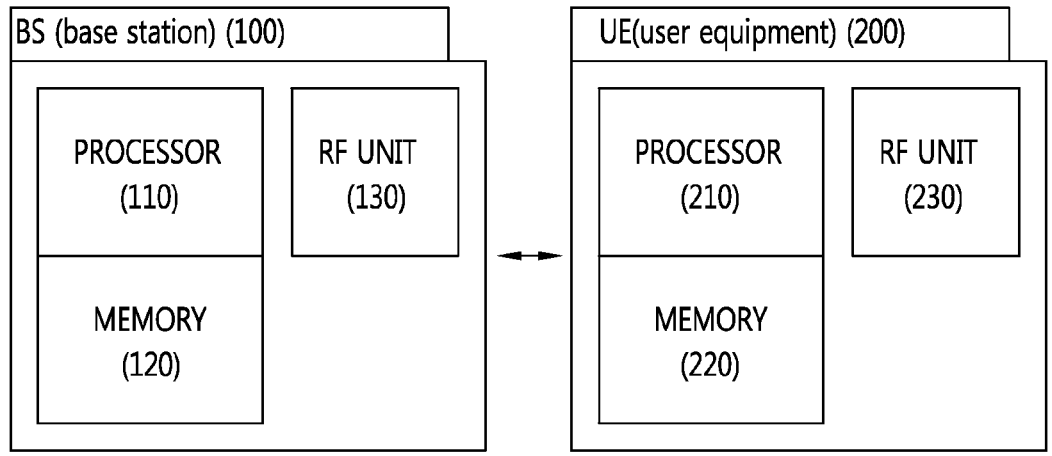
FIG. 16 is a block diagram of a base station and a user equipment according to an embodiment of the present invention.

FIG. 16 is a block diagram of a BS and a UE according to an embodiment of the present invention.

A BS 100 includes a processor 110, a memory 120, and a radio frequency (RF) unit 130. The processor 110 implements the proposed functions, procedures, and/or methods. The processor 110 may transmit UCI serving cell indication information indicating a transmission serving cell for each UCI type, and may receive different types of UCI from a UE through different serving cells. Layers of a radio interface protocol may be implemented by the processor 110. The memory 120 coupled to the processor 110 stores a variety of information for driving the processor 110. The RF unit 130 coupled to the processor 110 transmits and/or receives a radio signal.

A UE 200 includes a processor 210, a memory 220, and an RF unit 230. The processor 210 implements the proposed functions, procedures, and/or methods. The processor 210 receives a DL signal through at least one serving cell, and generates 1st UCI and 2nd UCI for the DL signal. Thereafter, the 1st UCI is transmitted through a 1st serving cell, and the 2nd UCI is transmitted through a 2nd serving cell. In this case, the 1st UCI and the 2nd UCI are different types of UCI. Further, the 1st serving cell and the 2nd serving cell may be indicated by UCI serving cell indication information received from a BS. Layers of a radio interface protocol may be implemented by the processor 210. The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means. Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A method of transmitting uplink control information (UCI), performed by a user equipment, in a carrier aggregation system in which a plurality of serving cells are aggregated, the method comprising:

receiving a downlink signal through at least one serving cell;

generating first UCI and second UCI with respect to the downlink signal;

transmitting the first UCI through a first serving cell; and transmitting the second UCI through a second serving cell, wherein the first serving cell and the second serving cell are different from each other, and the first UCI and the second UCI are different types of UCI, wherein the first UCI is acknowledgement/not-acknowledgement (ACK/NACK) indicating reception confirmation for a control signal or downlink data included in the downlink signal, and wherein the second UCI is channel state information (CSI) generated by measuring the downlink signal.

2. The method of claim 1, wherein the second UCI is a channel quality indicator (CQI) generated by measuring a reference signal included in the downlink signal.

3. The method of claim 1, further comprising receiving UCI serving cell indication information indicating the first serving cell and the second serving cell.

4. The method of claim 3, wherein the UCI serving cell indication information is received through a radio resource control (RRC) message.

5. The method of claim 1, wherein the first UCI is transmitted through a first physical uplink control channel (PUCCH) which is a control channel of the first serving cell, and the second UCI is transmitted through a second PUCCH which is a control channel of the second serving cell.

6. The method of claim 1, further comprising transmitting the first UCI through a third physical uplink shared channel (PUSCH) which is a data channel of a third serving cell, wherein the third serving cell is a serving cell selected in a serving cell group including the first serving cell.

7. The method of claim 1, further comprising transmitting the second UCI through a fourth PUSCH which is a data channel of a fourth serving cell, wherein the fourth serving cell is a serving cell selected in a serving cell group including the second serving cell.

8. The method of claim 1, wherein the first UCI and the second UCI are transmitted in the same subframe of the first serving cell and the second serving cell.

9. The method of claim 1, wherein a plurality of information bits constituting the first UCI or the second UCI are spread in a time domain by using block spreading coding, and are transmitted in a plurality of orthogonal frequency division multiplexing (OFDM) symbols in the same subframe.

10. The method of claim 1, wherein a plurality of information bits constituting the first UCI are transmitted by using a single PUCCH resource selected from a plurality of PUCCH resources and a bit value indicated by a modulation symbol transmitted using the single PUCCH resource.

11. An apparatus comprising:

a radio frequency (RF) unit for transmitting or receiving a radio signal; and a processor coupled to the RF unit and configured to:

receive a downlink signal through at least one of the serving cells;

generate first UCI and second UCI with respect to the downlink signal;

transmit the first UCI through a first serving cell; and transmit the second UCI through a second serving cell, wherein the first UCI and the second UCI are different types of UCI, wherein the first UCI is acknowledgement/not-acknowledgement (ACK/NACK) indicating reception confirmation for a control signal or downlink data included in the downlink signal, and wherein the second UCI is channel state information (CSI) generated by measuring the downlink signal.

12. The apparatus of claim 11, wherein the second UCI is a channel quality indicator (CQI) generated by measuring a reference signal included in the downlink signal.

13. The apparatus of claim 11, wherein the processor is further configured to receive UCI serving cell indication information indicating the first serving cell and the second serving cell.

14. The apparatus of claim 13, wherein the UCI serving cell indication information is received through a radio resource control (RRC) message.

15. The apparatus of claim 11, wherein the first UCI is transmitted through a first physical uplink control channel (PUCCH) which is a control channel of the first serving cell, and the second UCI is transmitted through a second PUCCH which is a control channel of the second serving cell.

16. The apparatus of claim 11, wherein the processor is further configured to transmit the first UCI through a third physical uplink shared channel (PUSCH) which is a data channel of a third serving cell, wherein the third serving cell is a serving cell selected in a serving cell group including the first serving cell.

17. The apparatus of claim 11, wherein the processor is further configured to transmit the second UCI through a fourth PUSCH which is a data channel of a fourth serving cell, wherein the fourth serving cell is a serving cell selected in a serving cell group including the second serving cell.

18. The apparatus of claim 11, wherein the first UCI and the second UCI are transmitted in the same subframe of the first serving cell and the second serving cell.

* * * * *